(12) United States Patent
Groiss

(10) Patent No.: US 6,751,578 B2
(45) Date of Patent: Jun. 15, 2004

(54) METHOD AND APPARATUS FOR EVALUATING A DIGITAL INFORMATION SIGNAL

(75) Inventor: Stefan Groiss, Villach (AT)

(73) Assignee: Infineon Technologies AG, Munich (DE)

( * ) Notice: Subject to any disclaimer, the term of this patent is extended or adjusted under 35 U.S.C. 154(b) by 44 days.

(21) Appl. No.: 10/158,993

(22) Filed: May 31, 2002

(65) Prior Publication Data

US 2002/0198689 A1 Dec. 26, 2002

(30) Foreign Application Priority Data

Jun. 1, 2001 (DE) ......................................... 101 26 801

(51) Int. Cl.$^7$ .............................................. G06F 15/00
(52) U.S. Cl. ........................ 702/189; 702/107; 702/190
(58) Field of Search .............................. 702/66, 69, 74, 702/79, 89, 106, 107, 189, 190, 191, 192, 193; 375/149, 150, 152, 320, 324, 326, 344, 346; 700/28, 38–39, 42

(56) References Cited

U.S. PATENT DOCUMENTS

| | | | | |
|---|---|---|---|---|
| 4,339,823 A | * | 7/1982 | Predina et al. ............... 375/294 |
| 4,672,381 A | * | 6/1987 | Labbe et al. ................... 342/99 |
| 5,465,406 A | * | 11/1995 | Whitecar et al. ......... 455/234.1 |
| 5,587,896 A | * | 12/1996 | Hansen et al. ................. 700/28 |
| 5,870,699 A | * | 2/1999 | Canada et al. ............... 702/190 |

* cited by examiner

Primary Examiner—Bryan Bui
(74) Attorney, Agent, or Firm—Marshall, Gerstein & Borun LLP

(57) ABSTRACT

An apparatus and method for evaluating a digital information signal to be transmitted. A superimposition of the information with an interference signal can endanger an error-free data transmission. In order to ensure a correct data transmission, the information signal is amplified with a variable gain, where the information signal has been band-pass-filtered and demodulated beforehand, and fed to an integral-action controller that keeps the gain of the amplifier at a value corresponding to a controller threshold. Advantageously, the integral-action controller has a shorter time constant for increasing the gain than for reducing it, with the result that the gain is increased more rapidly than it is reduced. Thus, the integral-action control of the gain ensures that the band-pass-filtered and demodulated information signal is above a digitization threshold during its pulses and below the digitization threshold during its pulse intervals.

17 Claims, 2 Drawing Sheets

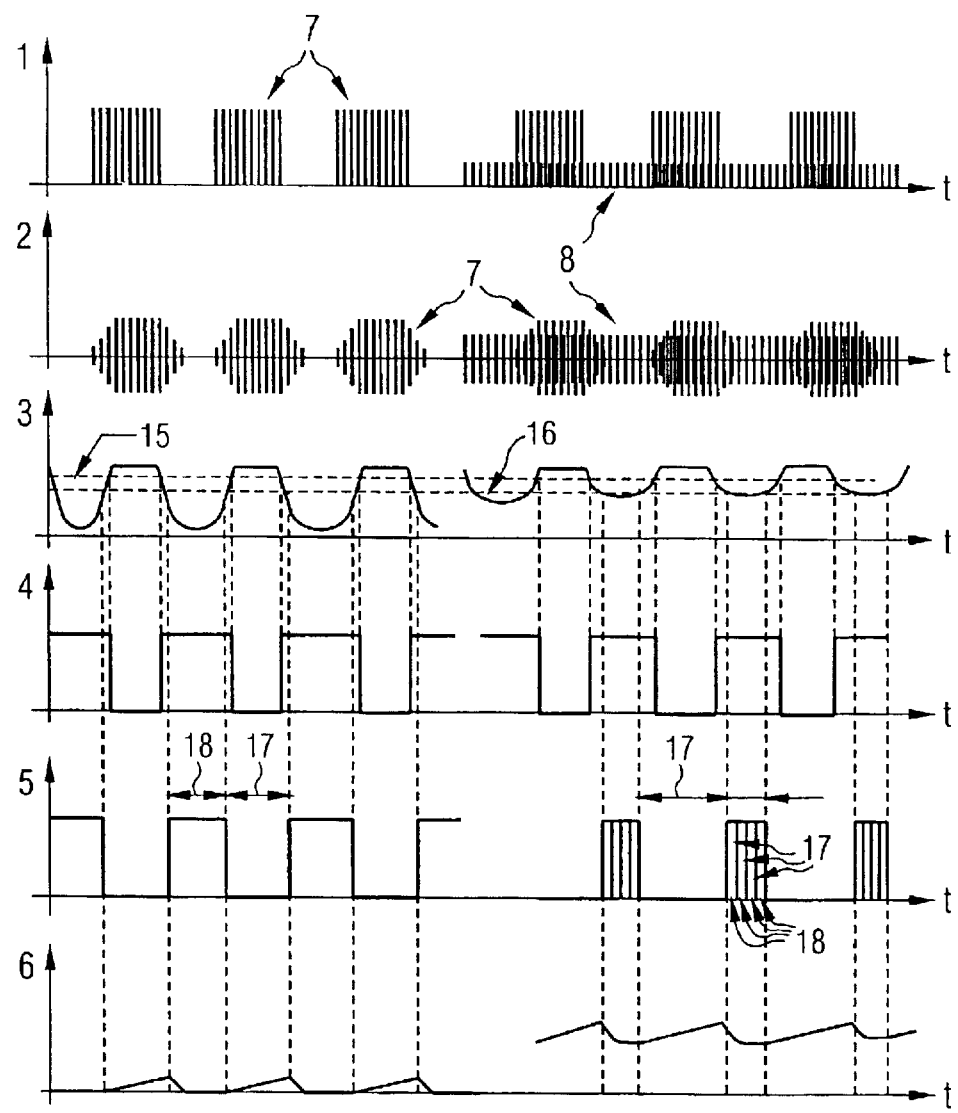

METHOD AND APPARATUS FOR EVALUATING A DIGITAL INFORMATION SIGNAL

BACKGROUND

1. Field

The present invention relates to a method and apparatus for evaluating a digital information signal and, more particularly, to evaluate the digital signal to ensure that the signal is transmitted error-free.

2. Discussion of Related Art

In the transmission of a digital information signal, it must, as a rule, be expected that the information signal is subject to interference or is overlaid by an interference signal. To extract the digital data from the information signal, the information signal is, as a rule, fed to a comparator as a digitizing device that extracts the data or the individual bits from the information signal. In this process, however, the interference may result in erroneous digitization of the information signal. In particular, two types of interference may endanger the correct transmission of data. On the one hand, there is continuous interference that can reach the comparator and give rise to error bits therein. If a band-pass filter is inserted upstream of the comparator, it is the continuous interference whose frequency range extends over the filter center frequency of the band-pass filter, that is especially troublesome. On the other hand, there is also aperiodic, short intensive interference that may comprise sufficient energy to induce the comparator to respond. Such aperiodic, short interference may also pass through the band-pass filter and likewise result in erroneous data.

SUMMARY

A method is disclosed for evaluating an information signal containing digital data, that includes amplifying the information signal with a variable gain. The information signal is then compared with a digitization threshold to extract the digital data. The information signal is also used as an actual value for an integral-action controller having a setpoint value, which is a controller threshold and has a value lower than a value of the digitization threshold. A control signal is then output from the integral-action controller that alters the amplification of the information signal in such a way that the variable gain is continuously increased when the information signal is less than the controller threshold and is continuously reduced when the information signal is greater than the controller threshold.

A circuit arrangement for evaluating an information signal containing digital data is also disclosed. The circuit arrangement includes an amplifier circuit having a variable gain for amplifying the information signal. A comparator circuit is provided for comparing the information signal with a digitization threshold to extract the data. Also included is an integral-action controller having an actual-value input to which the information signal is applied and having a setpoint value that is a controller threshold, the value of which is less than the digitization threshold. The integral-action controller is configured to continuously increase the variable gain of the amplifier circuit when the information signal is below the controller threshold, and to continuously decrease the variable gain when the information signal is greater than the controller threshold.

BRIEF DESCRIPTION OF THE DRAWINGS

FIG. 2 illustrates the time variation of various signals appearing in the circuit arrangement of FIG. 1.

DETAILED DESCRIPTION OF THE PREFERRED EXAMPLES

Figure 1:
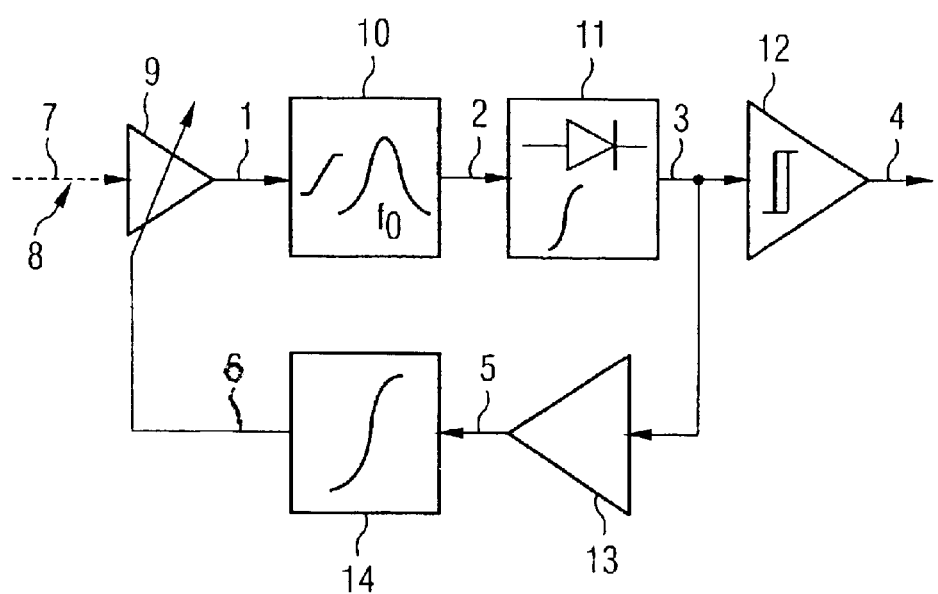
FIG. 1 illustrates a diagrammatic structure of a circuit arrangement for evaluating a digital information signal in accordance with the teachings of the present invention.

The circuit arrangement shown in FIG. 1 serves to evaluate a digital information signal 7 and ensure a correct digitization even if an interference signal 8 appears. The information signal 7 is transmitted in the form of bursts that are short alternating signals. An individual bit in the information signal 7 corresponds to a transmitted burst.

The circuit arrangement shown in FIG. 1 has a controllable amplifier 9 whose output signal 1 is fed to a band-pass filter 10 that additionally comprises a limiter. The limiter limits the output signal 1 of the amplifier 9 to a certain amplitude. The band-pass filter 10 has a band-pass with a certain center frequency $f_o$ which corresponds to the frequency of the individual bursts. This ensures that interference whose frequency range is outside the band-pass of the band-pass filter 10 is suppressed. Connected to the band-pass filter 10 is a demodulator 11 in which the output signal 2 of the band-pass filter 10 is rectified and integrated. In the output signal 3 of the demodulator 11, the alternating signal of an individual burst is integrated to form a continuous pulse at high level.

The demodulator signal 3 is applied to an output comparator 12 and a controller comparator 13. The output comparator 12 compares the demodulator signal 3 with a digitization threshold 15 (illustrated in FIG. 2) and may have a hysteresis for this purpose in order to avoid multiple pulses during signal transitions. The digital output signal 4 is present at the output of the output comparator 12.

In the controller comparator 13, the demodulator signal 3 is compared with a controller threshold 16 (illustrated in FIG. 2) that is below the digitization threshold 15 of the output comparator 12. The output 5 of the controller comparator 13 is applied to an integrator 14 that, together with the controller comparator 13, forms an integral-action controller 13, 14. The integral-action controller 13, 14 has two different time constants and is designed in such a way that it increases the gain of the amplifier 9 when the demodulator signal 3 is below the controller threshold 16 and reduces the gain of the amplifier 9 when the demodulator signal 3 is above the controller threshold 16. In this connection, during the reduction of the gain, a first time constant is applied that is longer than a second time constant that is applied during the increase in gain so that the gain of the amplifier 9 is increased more rapidly than it is reduced.

The operation of the circuit arrangement shown is now explained using the signal variations that occur as illustrated in FIG. 2, first without and then with an interference signal 8. For the segment shown, the first diagram of the amplifier signal 1 illustrates six pulses, the first three of which are interference-free and the second three of which are overlaid by the interference signal 8. In this connection, the interference signal 8 has the same frequency as the bursts of the information signal 7.

It can be seen in the diagram of the band-pass-filter signal 2 how the rectangular envelope curves of the signals of the information signal 7 are rounded by the band-pass filtering, while the interference signal 8 still appears since it could not be eliminated by the band-pass filter 10 because of the identical frequency. In the demodulator 11, the band-pass-filter signal 2 is now rectified and integrated or smoothed, thereby producing a variation in the demodulator signal 3, as shown. In the case of the first three signal pulses, the demodulator signal 3 falls during the signal intervals almost to zero, the signal variation in the signal intervals (i.e., the interval between the pulses of information signal 7) being severely rounded. In contrast thereto, the signal variation in the information signal 7 during the pulses is essentially rectangular since the amplitude limitation operates in this case. In the case of the second three signal pulses, there appears in the signal intervals, in addition to noise, the interference signal 8, with the result that the demodulator signal 3 only decreases slightly. In addition to the demodulator signal 3, this diagram illustrates the digitization threshold 15 that is applied in the output comparator 12 and the controller threshold 16 that is applied in the controller comparator 13.

If the demodulator signal 3 is above the controller threshold 16, the control output 5 of the controller comparator 13 becomes low for a first time duration 17 and induces the integral-action controller 13, 14 to reduce the gain of the amplifier 9 in accordance with a first time constant. If the demodulator signal 3 falls below the controller threshold 16, the output 5 of the controller comparator 13 becomes high for a second time duration 18 and induces the integral-action controller 13, 14 to increase the gain of the amplifier 9 in accordance with a second time constant.

In the case of the first three pulses, if an interference signal 8 does not as yet appear, the gain of the amplifier 9 is increased to the maximum value during the second time duration 18. The maximum value of the gain corresponds to the zero line of the integral-action controller output 6, the gain decreasing upwards in the diagram, with the result that a variation in the integral-action controller output 6 situated at the top results in a lower gain of the amplifier 9.

Since, in the case of the first three pulses, no interference signal 8 appears during the signal intervals, the demodulator signal 3 remains far below the controller threshold 16 despite the maximum gain. The demodulator signal 3 does not alter upwards owing to the limitation in the band-pass filter 10, so that, regardless of the gain of the amplifier 9, the maxima of the demodulator signal 3 are equally high. In the first time durations 17, if the demodulator signal 3 is above the controller threshold 16, the integral-action controller signal 6 rises a little, which slightly reduces the gain of the amplifier 9, this reduction in gain being rapidly leveled out again in the second time duration 18 owing to the shorter second time constant of the integral-action controller 13, 14. Furthermore, the first time constant is so long that, during the first time duration 17, the amplified information signal 7 does not fall below the value to which the band-pass filter 10 limits the information signal 7.

If the interference signal 8 now appears in the case of the second three pulses, the demodulator signal 3 reaches the controller threshold 16 even during the signal intervals owing to the interference signal 8 at the maximum possible gain of the amplifier 9. In this case, the controller comparator signal 5 becomes low even during the signal intervals to reduce the gain again. Since this proceeds very rapidly owing to the short second time constant, the demodulator signal 3 is reduced in a short time to such an extent that it again falls below the controller threshold 16, which alters the controller comparator signal 5 to low again, with the result that the integral-action controller 13, 14 slowly boosts the gain again in accordance with the first time constant. In this case, the gain of the amplifier 9 is controlled in such a way that the demodulator signal 3 constantly fluctuates around the controller threshold 16 in the signal intervals since the gain is alternately reduced with the first time constant and is increased with the second time constant.

Because the two time constants are of different length, the controller comparator signal 5 exhibits short transitions during the second three pulse intervals in which the demodulator signal 3 has exceeded the controller threshold 16 and the integral-action controller 13, 14 reduces the gain again.

In this way, if the interference signal 8 appears, the gain is reduced precisely to such an extent that the demodulator signal 3 is kept at the level of the controller threshold in the signal intervals. The gain is accordingly reduced only to such an extent that the demodulator signal 3 falls below the digitization threshold 15 in the signal intervals, with the result that the information signal 7 can be correctly digitized. The abovementioned gain control is active only if the amplitude of the interference signal 8 is sufficiently large. If the amplitude of the interference signal 8 falls below a certain value, the demodulator signal 3 always drops again below the controller threshold 15 long enough for the integral-action controller 13, 14 to set the gain of the amplifier 9 to the maximum value again in accordance with the second time constant. The gain of the amplifier 9 is only persistently lowered if the amplitude of the interference signal 8 is large enough. In this case, the demodulator signal 3 is kept at a constant value by the controller comparator 13 and the integrator 14, in which case the controller comparator 13 may have a hysteresis for the control threshold for a defined alternation of the two time constants in the integral-action controller 13, 14.

The intervals between the pulses of the information signal 7 must, however, have a certain length so that the integral-action controller 13, 14 can adjust to the interference signal 8. The longer a pulse of the information signal 7 lasts, the more substantially the integral-action controller 13, 14 can reduce the gain in the first time duration, with the result that the leveling-out operation in the second time duration needs a longer time to adjust the gain to a steady-state value again. Suitable adjustment of the various parameters, in particular the amplitude of the information signal 7, the gain, and the first and second time constants can achieve the result that the system does not respond sensitively to continuous interference signals 8 in the band-pass of the band-pass filter 10.

As discussed, the amplification of the information signal by means of the integral-action controller according to the teachings of the present invention can be controlled in such a way that the information signal essentially corresponds to the controller threshold, which is used as a setpoint value for the control. Because the digital information signal alternately assumes different signal levels for the transmission of the individual data bits, in particular only the two levels low and high, and is, for this reason, essentially a square-wave signal, the control can achieve the result that the information signal is equal to or less than the controller threshold in the signal intervals and above the digitization threshold during the signal durations. Regardless of the absolute level of the information signal and also of the interference signal, this ensures a correct digitization provided the ratio of the information signal during the information signal duration to the level of the interference signal is sufficiently high.

As an example, if the information signal is overlaid by an interference signal, the information signal increases, in particular, in the signal intervals. Should the information signal also be above the digitization threshold in the signal intervals, a correct digitization of the information signal is no longer possible. Since, however, the controller threshold or the setpoint value of the integral-action control is below the digitization threshold, the integral-action controller will, in such a case, reduce the gain until the information signal essentially corresponds again to the controller threshold.

This has the consequence that the high levels are above the controller threshold and, in particular, above the digitization threshold during the data signal duration of the information signal and the low levels of the information signal are certainly at or below the controller threshold during the data signal intervals, with the result that the information signal can be correctly digitized. Expediently, the integral-action control increases the gain only up to a certain maximum value. This may be arranged in such a way that, in the absence of an interference signal, the data signal is again always below the controller threshold in the signal intervals.

Advantageously, the integral-action control uses two different time constants to decrease the gain or to increase the gain, the time constant applied during the increase in gain being shorter than the time constant applied during the reduction, with the result that the gain is increased more rapidly than it is reduced. This ensures that the gain is also sufficiently boosted in short signal intervals and the information signal is high enough at any point in time for it to be above the digitization threshold during the signal durations or pulse durations. In the signal intervals, the gain is boosted either up to the maximum value or, in the absence of an interference signal to such an extent that the interference signal can be boosted in the signal intervals up to the controller threshold. Since the latter is, however, below the digitization threshold, the high level of the interference signal in the signal intervals does not endanger the correct digitization.

The first time constant, which is operative during the reduction in gain, is advantageously so long that the gain during the data-signal or pulse durations (i.e., in the case of a high level of the information signal) does not alter substantially in the time in which the information signal is above the controller threshold. In particular, the gain is not lowered during said time to such an extent that the information signal falls below the digitization threshold during the pulse duration.

The two different time constants can achieve the result that an erroneous information signal with its minima, which occur during the signal intervals and to which only the interference contributes, is in the vicinity of the controller threshold, with the result that the individual pulses or data signals are accordingly above the latter and can be correctly digitized. Given a sufficiently short second time constant, the gain is immediately increased again in the signal intervals if the information signal falls below the controller threshold until the information signal reaches the controller threshold. Constantly increasing and reducing the gain alternately during the signal intervals keeps the information signal at the controller threshold. As soon as a pulse appears again and the information signal rises, only the first time constant is operative and is, however, so long that the gain is not appreciably reduced during the pulse duration and the information signal has a sufficiently high level to exceed the digitization threshold. As soon as the information signal falls again in the signal intervals and falls below the controller threshold, the gain is alternately increased and reduced as described above, the interference signal being kept at the controller threshold. In this process, the gain is increased somewhat at the beginning in order to compensate for the reduction in gain during the pulse duration.

Also advantageously, there can be inserted downstream of the amplifier an amplitude limiter that limits the output signal of the amplifier to a certain amplitude. This ensures that, even in the case of a very high input signal, the downstream circuit sections cannot be overdriven and malfunctions occur. This limitation mechanism permits a variation in the input signal over several powers of ten under some circumstances.

Furthermore, provision may be made to transmit the digital data with the aid of an alternating signal of one frequency and to insert a band-pass filter downstream of the amplifier whose pass-band corresponds to the abovementioned certain frequency. In this case, a demodulator is necessary that rectifies the band-pass-filtered alternating signal and then feeds it to the comparator circuit or the integral-action controller. If the digital information signal is transmitted in the form of bursts, short individual pulses of constant frequency, the demodulator may also comprise an integrator that integrates the individual bursts during the signal duration.

Although certain apparatuses constructed in accordance with the teachings of the invention have been described herein, the scope of coverage of this patent is not limited thereto. On the contrary, this patent covers all embodiments of the teachings of the invention fairly failing within the scope of the appended claims either literally or under the doctrine of equivalents.

What is claimed is:

1. A method for evaluating an information signal containing digital data, comprising:
    amplifying the information signal with a variable gain; and
    comparing the amplified information signal with a digitization threshold in order to extract the digital data;
    using the amplified information signal as an actual value for an integral-action controller having a setpoint value, which is a controller threshold lower than the digitization threshold, and
    outputting a control signal from the integral-action controller that alters the amplification of the information signal in such a way that the variable gain is continuously increased when the information signal is less than the controller threshold and is continuously reduced when the information signal is greater than the controller threshold.

2. A method according to claim 1, wherein the integral-action control applies a first time constant during the reduction of the variable gain and a second time constant during the increasing of the variable gain, wherein the second time constant is shorter than the first time constant.

3. A method according to claim 2, wherein the first time constant is set such that the variable gain does not reduce during a time duration in which the information signal is above the controller threshold to such an extent that the information signal falls below the digitization threshold or the controller threshold.

4. A method according to claim 2, wherein the second time constant is set such that the variable gain reaches an upper steady-state value again during a time duration in which the information signal is below the digitization threshold.

5. A method according to claim 1, wherein the variable gain is limited to an upper maximum value.

6. A method according to claim 1, wherein the information signal is amplitude-limited after amplification.

7. A method according to claim 1, wherein the information signal is band-pass-filtered after amplification.

8. A method according to claim 1, wherein the information signal is demodulated after amplification.

9. A circuit arrangement for evaluating an information signal containing digital data comprising:
    an amplifier circuit having a variable gain for amplifying the information signal; and a comparator circuit for comparing the amplified information signal with a digitization threshold to extract the data; and an integral-action controller having an actual-value input to which the amplified information signal is applied and having a setpoint value that is a controller threshold, which is less than the digitization threshold, the integral-action controller configured to continuously increase the variable gain of the amplifier circuit when the information signal is below the controller threshold, and to continuously decrease the variable gain when the information signal is greater than the controller threshold.

10. A circuit arrangement according to claim 9, wherein the integral-action controller is designed in such a way that, during reduction of the variable gain, the integral-action controller applies a first time constant and during increase of the variable gain, the integral-action controller applies a second time constant that is shorter than the first time constant.

11. A circuit arrangement according to claim 10, wherein the first time constant is set such that the variable gain is not reduced during a time duration in which the information signal is above the controller threshold to such an extent that the information signal falls below the digitization threshold or the controller threshold.

12. A circuit arrangement according to claim 10, wherein the second time constant is set such that the variable gain reaches an upper steady-state value again during a time duration in which the information signal is below the digitization threshold.

13. A circuit arrangement according to claim 9, wherein the integral-action controller is configured to limit the variable gain to an upper maximum value.

14. A circuit arrangement according to claim 9, wherein the circuit arrangement comprises an amplitude limiter.

15. A circuit arrangement according to claim 9, wherein the circuit arrangement comprises a band-pass filter.

16. A circuit arrangement according to claim 9, wherein the circuit arrangement comprises a demodulator.

17. A circuit arrangement according to claim 9, wherein the integral-action controller comprises a controller comparator and a downstream integrator.

* * * * *